Figures 1, 2, 3:
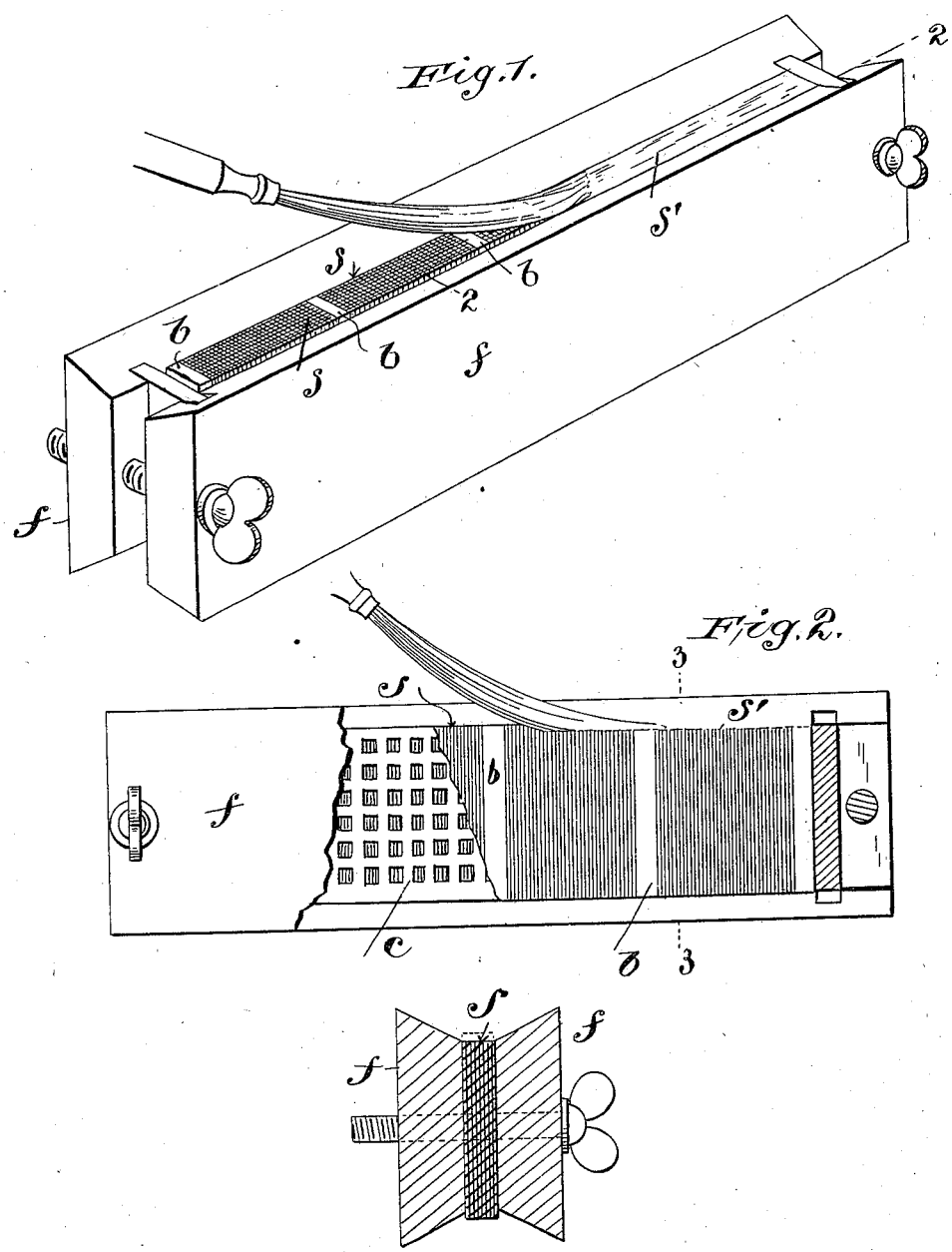

No. 728,189. PATENTED MAY 19, 1903.
J. BIJUR.
PROCESS OF MAKING BATTERY PLATES.
APPLICATION FILED AUG. 14, 1900. RENEWED SEPT. 26, 1902.
NO MODEL. 6 SHEETS—SHEET 1.

WITNESSES
INVENTOR

No. 728,189. PATENTED MAY 19, 1903.
J. BIJUR.
PROCESS OF MAKING BATTERY PLATES.
APPLICATION FILED AUG. 14, 1900. RENEWED SEPT. 26, 1902.
NO MODEL. 6 SHEETS—SHEET 2.

No. 728,189. PATENTED MAY 19, 1903.
J. BIJUR.
PROCESS OF MAKING BATTERY PLATES.
APPLICATION FILED AUG. 14, 1900. RENEWED SEPT. 26, 1902.
NO MODEL. 6 SHEETS—SHEET 4.

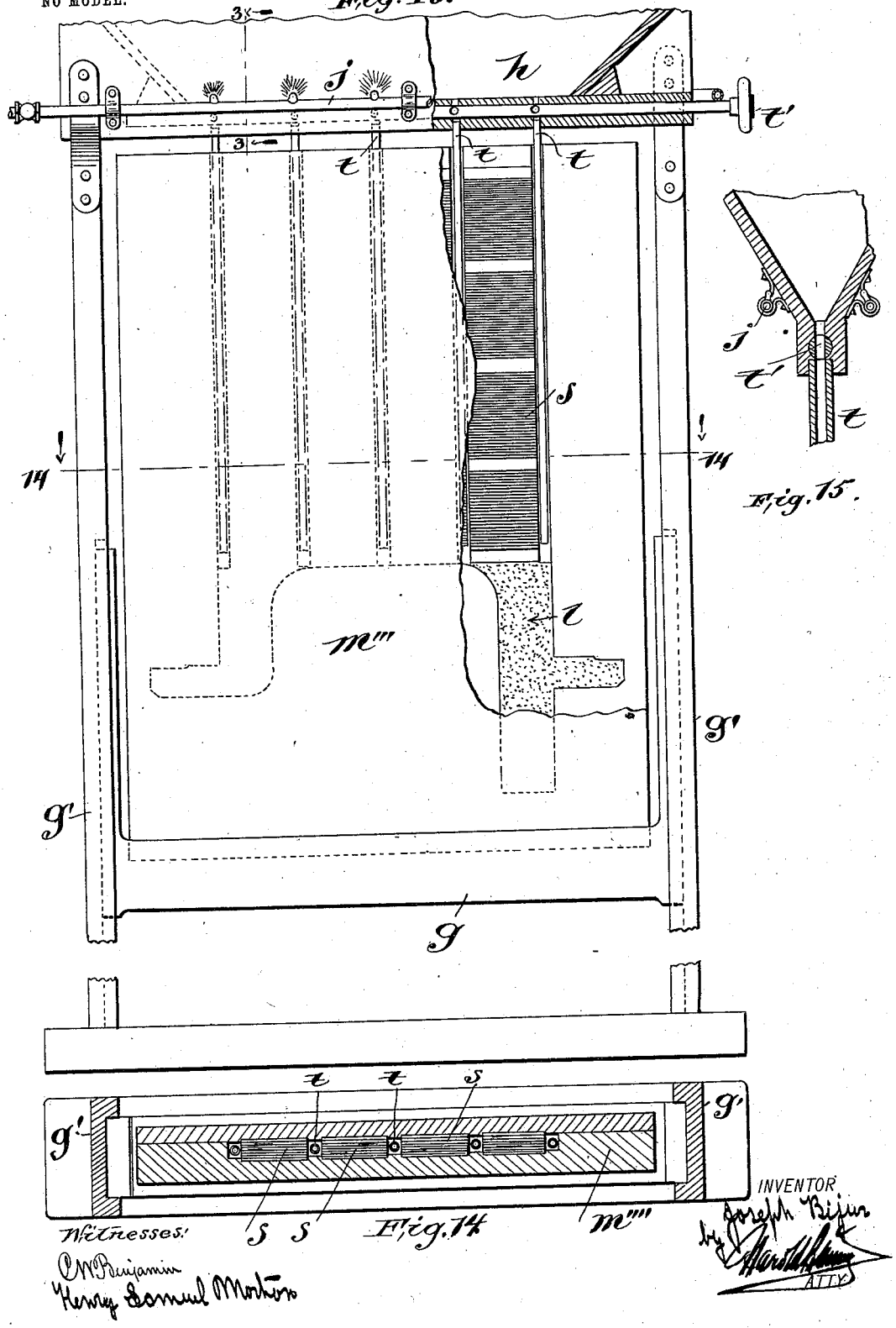

No. 728,189. PATENTED MAY 19, 1903.
J. BIJUR.
PROCESS OF MAKING BATTERY PLATES.
APPLICATION FILED AUG. 14, 1900. RENEWED SEPT. 26, 1902.
NO MODEL. 6 SHEETS—SHEET 6.

No. 728,189. Patented May 19, 1903.

UNITED STATES PATENT OFFICE.

JOSEPH BIJUR, OF NEW YORK, N. Y.

PROCESS OF MAKING BATTERY-PLATES.

SPECIFICATION forming part of Letters Patent No. 728,189, dated May 19, 1903.

Application filed August 14, 1900. Renewed September 26, 1902. Serial No. 124,953. (No specimens.)

*To all whom it may concern:*

Be it known that I, JOSEPH BIJUR, electrical engineer, a citizen of the United States, and a resident of the borough of Manhattan, in the city and State of New York, (post-office address No. 32 Nassau street, borough of Manhattan, New York city,) have invented certain new and useful Improvements in the Art of Making Battery-Plates, of which the following is a specification.

The following is a description of the improvements, referring to the accompanying drawings, which illustrate several ways of utilizing my process.

One of the well-known ways of making storage-battery plates is to electrolytically "form" the active material upon the surface of lead plates by electrolysis. The present invention, though not limited to any type of plate, is particularly applicable to the manufacture of such plates ready for the "forming" action.

The object of the present invention is to improve and cheapen battery-plates, and especially those of the Planté or formed type, by enabling the manufacturer to make them in the most improved form and at a low cost.

The improved plates which are produced by the process form the subject-matter of a separate patent application.

I have discovered that fluid lead can be uniformly and integrally joined to solid lead without destroying the shape if the fluid lead be still and if the surfaces are clean and if the fluid lead contains just enough heat to fuse the edge of the solid lead and not enough heat to fuse any considerable portion of the solid lead. It will not do to flow the fluid lead around the solid lead in the ordinary and natural manner, because the lead in flowing will supply too much heat to the solid lead at the points of influx and not enough heat in the remote parts of the mold which the fluid lead last reaches. The fluid lead should be at about red heat and should be deposited against the solid lead in a manner that will not permit it to flow from one part of the mold to the other. Moreover, the solid lead pieces preferably should be heated nearly to their melting-point and should be free from oxid. Preferably, also, the mold in which the solid shreds, strips, or other pieces of lead are placed should be heated nearly to the melting-point of lead.

The accompanying drawings illustrate four ways of carrying out the process and also illustrate a preliminary step which may or may not be resorted to, but which I prefer to utilize in certain instances—as, for example, in making negative plates from fine lead shreds.

Figure 4:
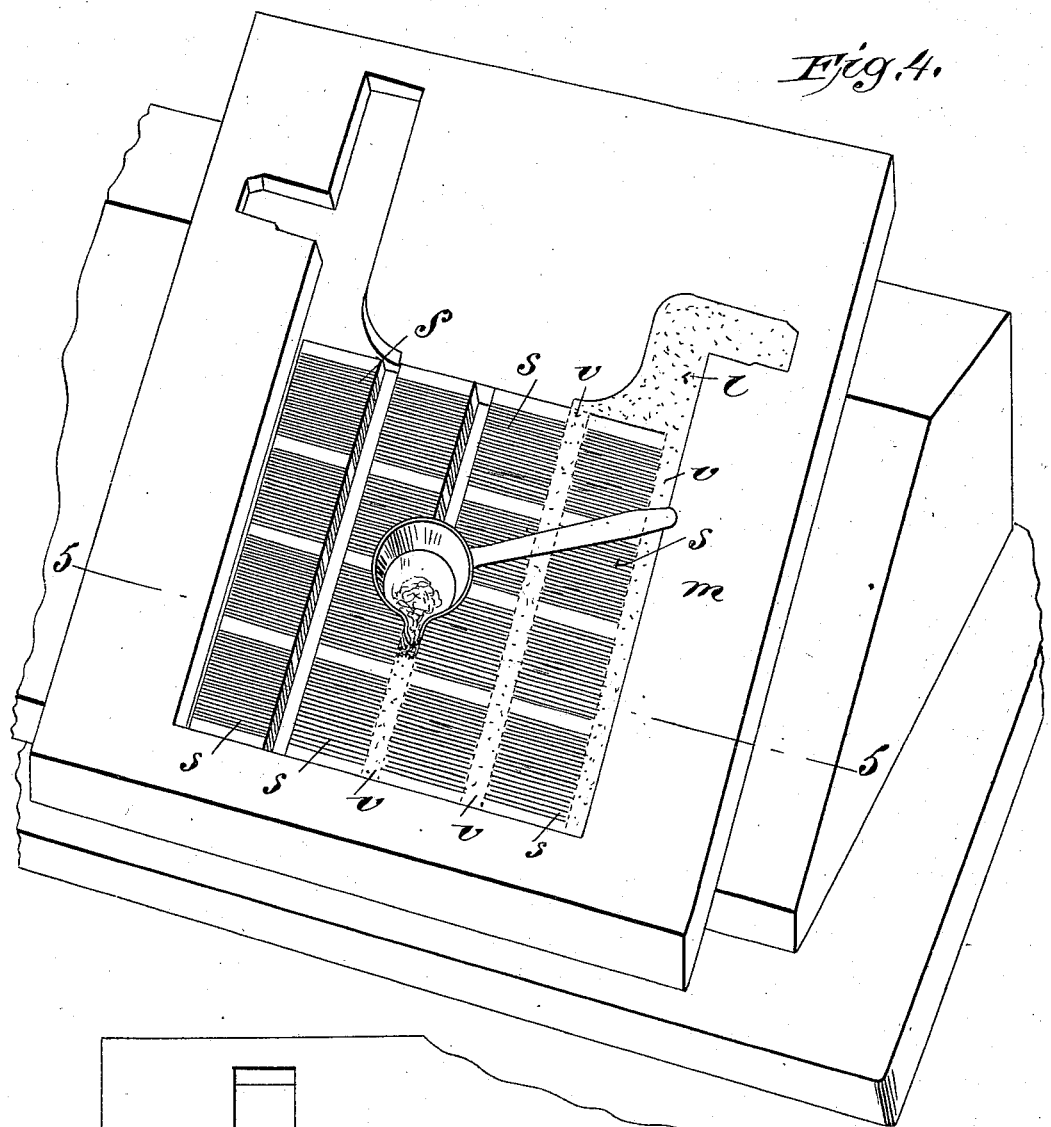
Figure 5:
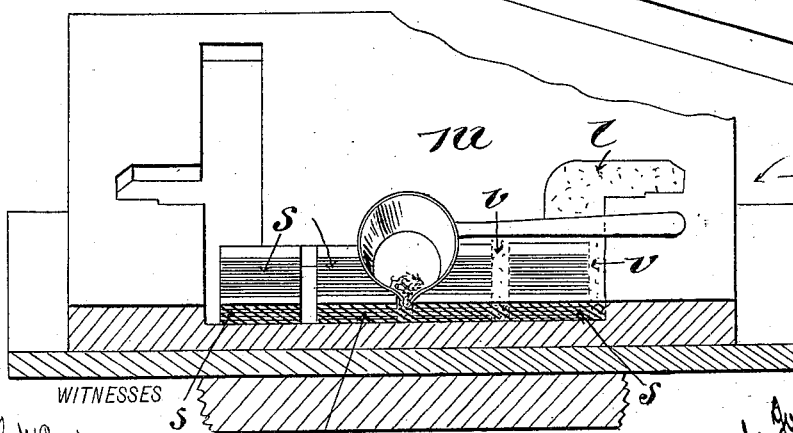
Figure 6:
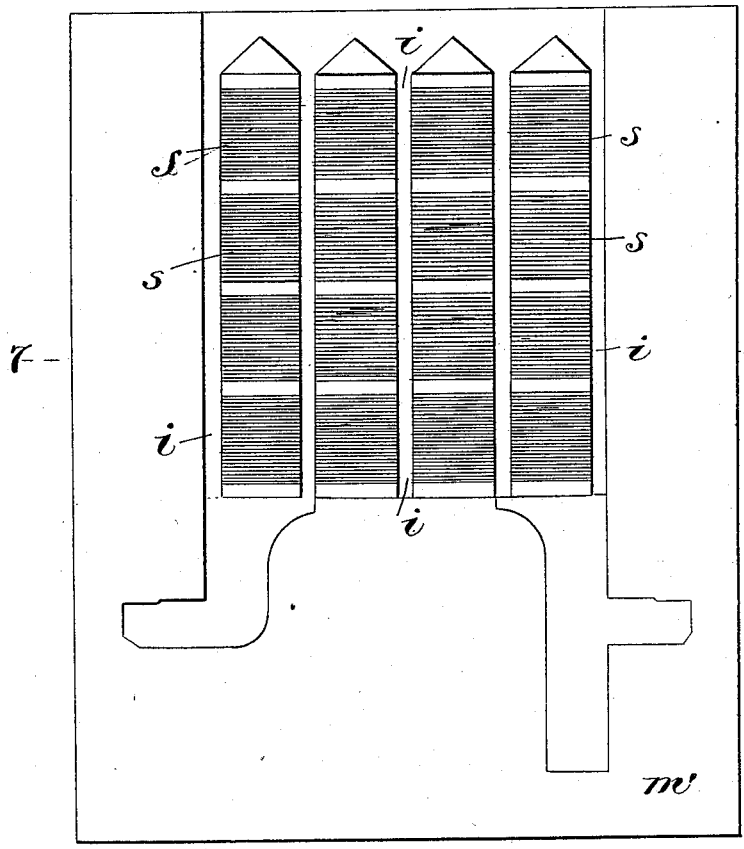
Figure 7:
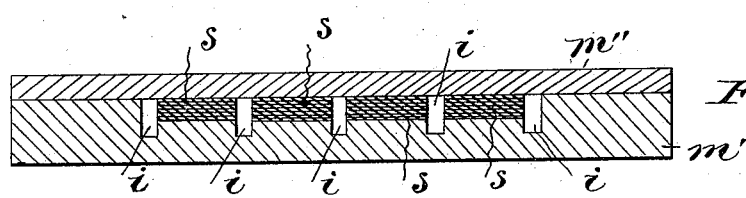
Figure 8:
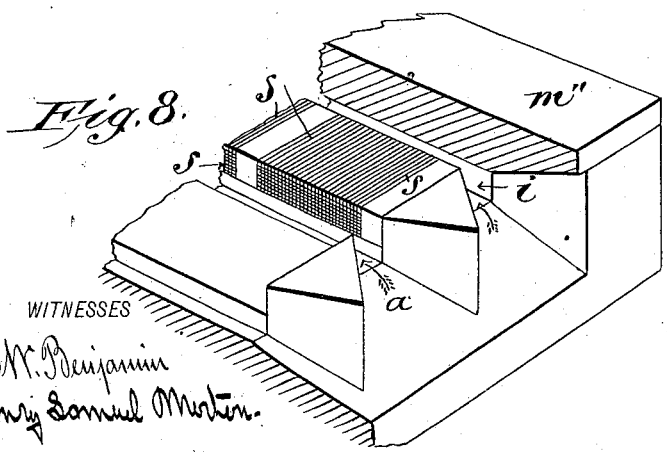
Figure 9:
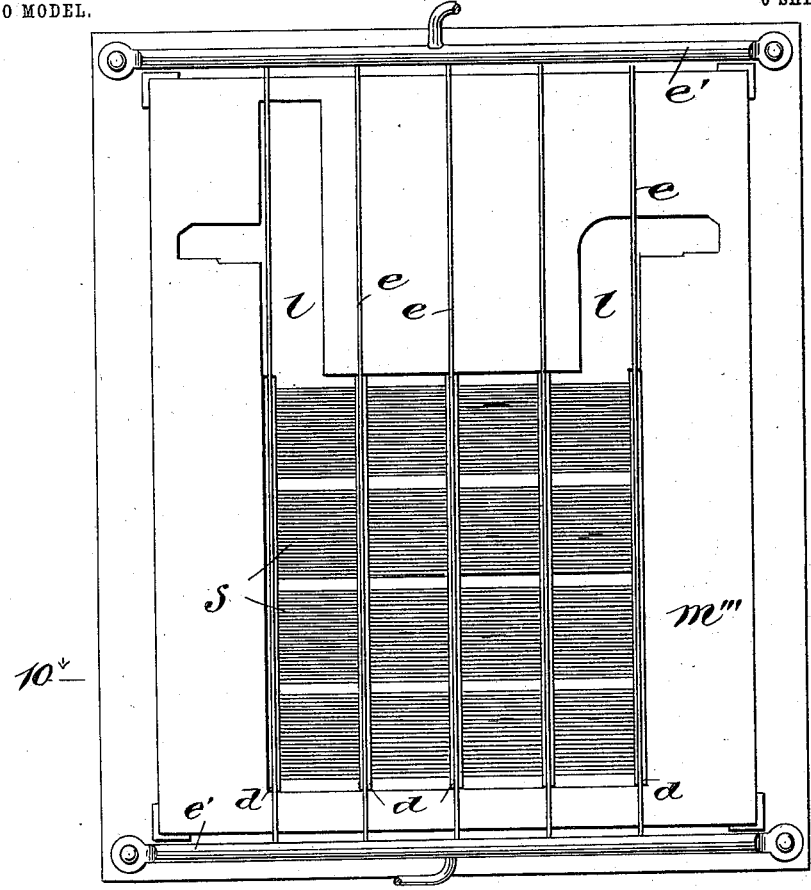
Figure 10:
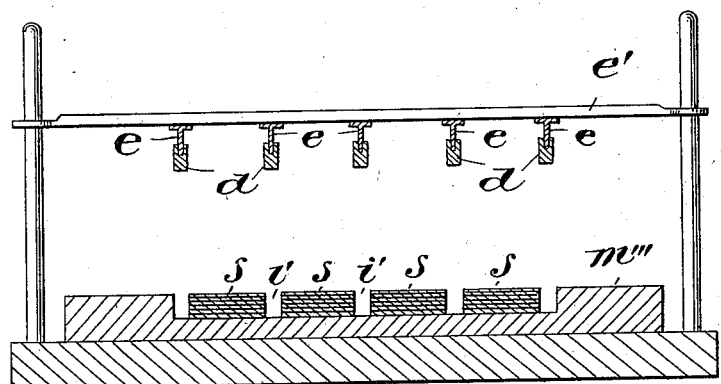
Figures 11, 12:
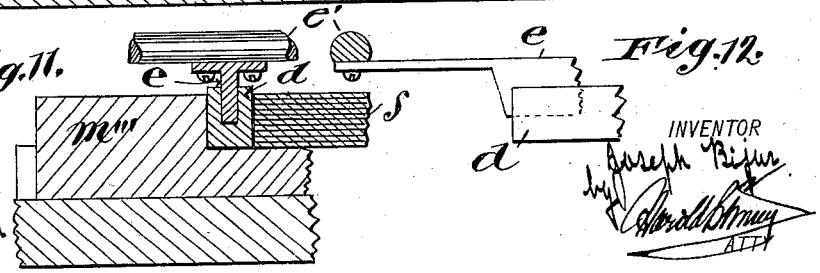
Figure 16:
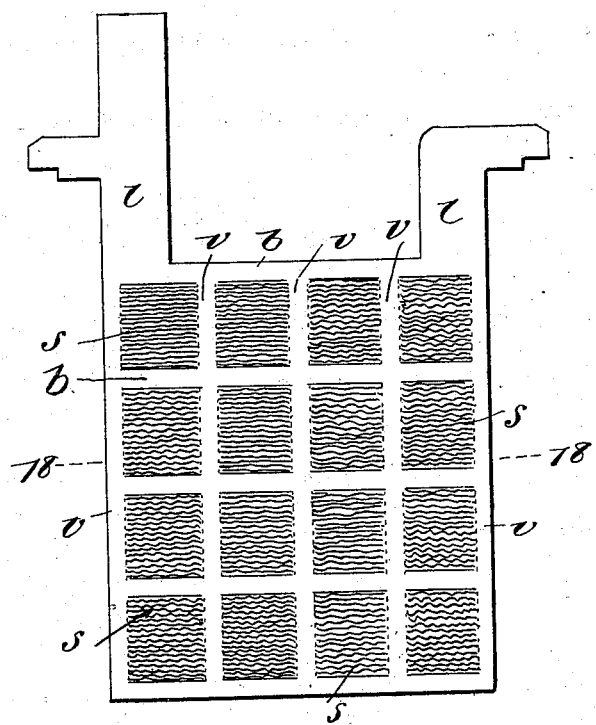
Figure 17:
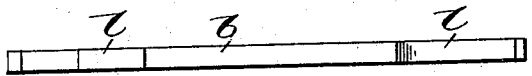
Figure 18:

Figure 1 is an isometric drawing showing minute lead strips held in a frame while their ends are being autogenously united to form one of the units or panels for a battery-plate. Fig. 2 is a side view of the same with part of the frame broken away. Fig. 3 is a cross-section of the same. Figs. 4 and 5 are a view looking down upon a mold and a vertical cross-section of such mold as employed in one way of carrying out the process and uniting the several units to the bars or supports of the plate. Fig. 6 shows a mold with one side removed as adapted to another way of carrying out the process. Fig. 7 is a cross-section through the complete mold. Fig. 8 is a perspective showing certain details. Figs. 9, 10, 11, and 12 are a face view, cross-section, and two detailed views of a third form of apparatus for carrying out the process. Fig. 13 is a vertical view, partly in section and partly broken away, showing the apparatus as preferred at the date of this application for carrying out my invention. Fig. 14 is a cross-section, and Fig. 15 shows a detail thereof. Figs. 16, 17, and 18 are a face view, plan view, and horizontal section of the finished plate of one form made by my improved process.

Throughout the drawings like letters of reference indicate like parts.

One form of finished plate is shown in Figs. 16, 17, and 18. The form of plate illustrated consists of a number of panels or units of fine lead strips or shreds *s* between the vertical ribs or supports *v* and preferably, also, horizontal ribs or bars *b*. The usual supporting and connecting lugs *l l* are provided. These strips or shreds or other shaped parts may, if desirable, be separately formed and subsequently united into a unit or panel, in which case the strips *s* after being cut, pressed, or otherwise produced are assembled in groups and placed in position in the mold. Then the ribs $v$ and lugs $l\ l$ of lead or antimoniated lead are integrally united to the strips $s$ in the manner which I will now describe.

The strips or shreds $s$ may be arranged in groups and placed in the mold, as shown in Figs. 4 and 5, or they may be first autogenously united at their ends to form groups, units, or panels, and these may then be placed in the mold as in Figs. 4 and 5. When they are to be first united at their ends, the procedure is as follows: The strips or shreds $s$ are assembled and held in number and position, as desired, to form one of the units or panels for the battery-plate and are held in the frame or mold $f$. They are held so that their ends which are to be united are uppermost, and a blast-flame or other means of producing intense heat is then applied to the ends, as seen in Figs. 1 and 2, by melting the lead locally and causing it to run together and unite, as at $s'$. The melted lead remains in place until it solidifies and unites the strips, because the mold being held as described and shown there is no tendency for the lead to flow away. It will also be noticed that the entire end of each one of the minute strips $s$ is fused and joined to the ends of the contiguous strips or shreds $s$. Stiffening strips or bars $b$ may be employed at intervals, if desired, to give greater rigidity to the structure and better support to the active material. A thin metallic casing (see Fig. 2) may be formed by a perforated plate $c$ at each side of the strips, if desired. In Figs. 4 and 5 one way of uniting these units or assemblages of shreds or strips $s$ to the bars or supports of the battery-plate is illustrated. An open mold $m$ is employed. The assemblages of shreds or strips $s$, however designed and however produced and either previously united or assembled without being so united, are placed in position in the mold, as in Fig. 4, each being placed in the position which it is to have in the finished plate; but instead of then closing the mold and pouring in molten lead and allowing it to flow freely all around these assemblages of strips or units the mold and the units within it are first heated nearly to the temperature of melted lead, and the mold is then tilted or inclined, as shown in the figures. Molten lead superheated, so as to be considerably above its melting-point, is then poured carefully into the successive intervals or channels between the assemblages of strips, commencing in each instance at the lower end of the interval or channel and proceeding up the inclination toward the upper end of the channel, so that the melted lead as it flows into the channel shall remain in place without flowing from one point to another and in solidifying so form the ribs $v$.

In Fig. 4 the middle channel is shown partly filled with the lead in the manner described. The ribs $v$ and lug $l$ at the right are shown completed. Finally, after all the intervals in the mold have been filled the casting is complete. This way of carrying out my process makes a good joint between the strips, panels, or groups and the lead that is cast between them to form the supports of the battery-plate; but great care is necessary to prevent the vertical bars or supports $v$ from being uneven and rough unless they are subsequently finished off by cutting or planing them. It will be seen that in accordance with my process the superheated lead as it is poured into the interval to form the rib $v$ lies quietly against the ends of the strips $s$ and is able to fuse and unite with the ends of the strips, giving up its extra heat without flowing from one part of the mold to another. In short, the melted lead is deposited so as to come in contact with the strips only at its final resting-place.

In Figs. 6, 7, and 8 the mold $m'$ has a cover $m''$, and the channels $i$ between the assemblages of strips $s$ extend deeper into the mold, so that when the mold is inclined slightly surperheated lead may be poured down into the bottoms of the channels $i$, as indicated by the arrow $a$ in Fig. 8, and will flow quickly to the bottom of each channel and fill up the channel, commencing at the bottom, without previously touching the ends of the strips $s$. Only one unit or assemblage of strips $s$ is shown in place in Fig. 8. When such a mold is employed in carrying out the process, it is usually very important that the mold should be heated nearly to the melting-point of lead or that the channels of the mold be lined with poor conductor of heat, so as not to materially cool the superheated lead before it has had time to reach its final resting-place in each of the channels $i$. The ribs of the plate made in this manner of course project on one side of the plate and have to be cut off if objectionable. In Figs. 9 to 12 an open mold $m'''$ is employed. The assemblages or units of lead strips or shreds $s$ are placed in the mold as above. Suitably supported and electrically connected above the mold are a series of electrical resistance-strips $e$, of steel or iron, arranged to be vertically adjusted with the frame or supports $e'$. These strips correspond in position to the several ribs $v$, Fig. 16, that are to be formed in the battery-plate in the channels $i'$ between the lead strips $s$. The strips may be electrically connected in series or parallel, so that the electric current may pass between them and heat them to white heat. Lead ribs or bars $d$, previously cast of a size and cross-section to fit in the channels between the strips $s$ and grooved as shown or otherwise adapted to be secured to the steel strips $e$, are placed upon each of the strips $e$ and then are lowered into place in the channels formed between the assemblages of lead strips $s$. The current is then turned on and the lead strips $d$ are quickly melted and slightly superheated. As soon as the joint takes place between the melted lead and the strips $s$ the steel resistance-strips $e$ are raised, leaving the melted lead to solidify and unite with the lead shreds or strips $s$. The ribs $d$ must of course be of such cross-section and length as to contain the necessary amount of lead to suitably fill the channels and form the vertical supporting-ribs of the battery-plate.

In Figs. 13, 14, and 15 my preferred apparatus by which the melted lead is conducted directly to its final resting-place before touching the ends of the strips $s$ is shown. A mold $m^4$, open only at one end, is mounted in a vertically-adjustable slide $g$, which travels in guides $g'$ beneath a tank or hopper $h$, which is filled with molten lead. Gas-jets $j$ or other devices should be provided to maintain the molten lead at a temperature considerably above its melting-point. A series of tubes $t$, controlled by a valve $t'$, extend down the tank or hopper in positions to exactly register with the spaces between the assemblages of shreds or strips $s$ in the mold $m^4$. The mold is raised, so that the tubes $t$ extend nearly to the bottoms of the intervals between the groups of strips $s$, and then the superheated lead is allowed to flow down through the tubes $t'$, and the mold is gradually lowered, so that the melted lead is deposited progressively to form the vertical ribs $v$ in the plate, Fig. 14, from the bottom upward throughout the mold, this way being more certain than attempting to squirt the molten lead all the way to the bottom of the channel without its impinging on the solid lead at either side. The tubes $t$, if of conducting material, should be heated, so as not to chill the lead when it first flows through them, in which case the lugs $l\ l$ may be previously cast and laid in the mold, so as to be merely united to the other parts by the molten lead. If, however, the lugs $l\ l$ are not placed in the mold, but, on the contrary, the molten lead is allowed to flow down the tubes $t$ to form the entire lugs $l\ l$, this will obviate the necessity of previously heating the tubes $t$, as they will be raised to the desired temperature before the melted lead begins to rise and form the vertical ribs in the intervals between the strips $s$. This is my preferred way of carrying out my process at the date of this application, as it is simple and expeditious and has all the advantages of the usual methods of casting in addition to the fact that the melted lead is deposited without flowing from one part of the mold to the other. Subsequently the plate is electrolytically formed, so as to convert the surface of the active areas into active material.

In the foregoing description of the invention I have chosen for illustration a Planté plate having units or panels consisting of separately-produced lead shreds or strips; but it must be understood that the invention is equally applicable to uniting any chosen members, panels, or units of any suitable design to form either a Planté plate or a pasted plate or any other type of plate.

I am of course aware that ribbons of lead have been wound up into hanks or coils and secured to vertical supports in some instances by casting the supports about them, in other instances by soldering them, and in still other instances by forcing them mechanically into recesses in a previously-cast lead grid. The distinctions between these methods of manufacture and my own will be apparent from the foregoing description and the following claims.

I wish it to be understood as not making any distinction, so far as this process is concerned, between lead and alloy—such, for example, as lead antimony (eight per cent. antimony and ninety-two per cent. lead,) which latter is desirable for the ribs as being stiffer than the pure lead, which is more desirable for the active areas.

Obviously some features of the foregoing invention may be used without other features and may be carried out in widely-varying ways. The process is independent of any particular form of apparatus. For this reason I claim the following:

1. In the process of uniting groups or assemblages of lead strips, shreds, or other parts, in constructing a storage-battery plate, the improvement which consists in first heating the strips, shreds, or other parts and subsequently casting the intermediate ribs or supports of the plate in spaces or intervals formed between opposing groups or assemblages of such strips, shreds, or other parts while the molten lead is at a temperature above the melting-point of the said strips, shreds, or other parts.

2. The process of uniting parts of lead battery-plates, which consists in heating solid parts adapted to become active, to a temperature less than their melting-point and above 200° Fahrenheit, and then depositing melted and superheated lead, at a predetermined temperature above the said melting-point of the said solid parts, in an interval adjacent to and in contact with the solid parts, whereby the said melted and superheated lead shall give up heat to raise the solid parts to their melting-point and to melt them superficially before it cools to the said melting-point of the said solid parts.

3. The process of uniting parts of battery-plates, which consists first in autogenously uniting the ends of assemblages of strips, shreds, or other parts adapted to become active, and arranged in groups or assemblages with intervals for the formation of ribs or supports, and secondly in thereafter depositing superheated lead between said assemblages to form solid ribs or supports, thereby causing the melted lead as it solidifies to homogeneously unite the said assemblages of said strips, shreds, or other parts adapted to become active, substantially as set forth.

4. The process of uniting parts of a battery-plate by an intermediate relatively long and narrow rib between such parts, which consists in supporting solid parts in position to present opposed faces to the relatively long and narrow interval in which the rib is to lie, the planes of said opposed faces being greatly inclined to the horizontal and then, in the said interval, bringing melted and superheated lead, as distinguished from solder, at a temperature in excess of the melting-point of the said solid parts, into direct contact with the said opposed faces of said solid parts at opposite sides of the said interval, and preventing the lead from making contact therewith until substantially at its final resting-place, whereby the said superheated lead shall not flow lengthwise of the said interval while in contact with the solid parts, and shall give up heat upon opposite sides in a regular and determinate manner throughout all portions while cooling down to the melting-point of the solid parts.

5. The process of casting parts of battery-plates, onto the parts adapted to become active, while such parts adapted to become active are held in a suitable mold with at least one interval or space for the molten metal, which consists in the following procedure: superheating melted lead and directing it downward to the bottom of the interval or space to be filled and progressively directing the freshly-incoming portions of the melted lead to the successive portions of said interval or space from the bottom to the top as said interval or space is gradually filled up, whereby the superheated lead is deposited directly against the portions of the said parts where it is to remain and solidify, for substantially the purposes set forth.

Signed this 25th day of June, 1900, at New York, N. Y.

JOSEPH BIJUR.

Witnesses:
EDWARD A. FRESHMAN,
HENRY C. MORTON.